United States Patent

Smith

[11] 4,051,425
[45] Sept. 27, 1977

[54] AC TO DC POWER SUPPLY CIRCUIT

[75] Inventor: Jerry L. Smith, Broad Brook, Conn.

[73] Assignee: Telephone Utilities and Communications Industries, Inc., Chester, Conn.

[21] Appl. No.: 546,555

[22] Filed: Feb. 3, 1975

[51] Int. Cl.² .......................................... H02M 1/08
[52] U.S. Cl. ...................................... 363/86; 323/24
[58] Field of Search ..................... 321/11, 14, 18, 24, 321/21, 25; 323/7, 24

[56] References Cited

U.S. PATENT DOCUMENTS

| | | | |
|---|---|---|---|
| 3,253,209 | 5/1966 | Hordosi | 323/22 T X |
| 3,253,212 | 5/1966 | Wentworth | 323/56 |
| 3,372,326 | 3/1968 | Stefanov | 323/24 X |
| 3,434,039 | 3/1969 | Misencik et al. | 323/24 X |
| 3,466,527 | 9/1969 | Ping Sun Chun | 321/14 |
| 3,603,865 | 9/1971 | Liebenthal | 321/47 |
| 3,646,423 | 2/1972 | Tatematsu et al. | 323/24 X |
| 3,803,382 | 4/1974 | Tajbl et al. | 323/24 X |
| 3,873,282 | 3/1975 | Finch | 323/24 X |
| 3,911,324 | 10/1975 | Bishop | 321/25 X |

Primary Examiner—William M. Shoop
Attorney, Agent, or Firm—McCormick, Paulding & Huber

[57] ABSTRACT

An electrical power supply circuit for converting alternating circuit power into a direct current output comprises a transformer and rectifier, a filter capacitor across the output terminals and a phase control switching device and a non-saturating inductor in the primary circuit. The circuit arrangement reduces the volt-time integral of the transformer and allows its core to be made of a smaller size, in comparison to the transformer cores of previously known power supplies, without danger of saturation. Other advantages such as low RFI, reduced transformer wire size and overload current protection are obtained. A commutator circuit may also be provided for turning off the phase control switching device before the end of the associated half cycle of input voltage to further reduce the transformer volt-time integral and to accordingly allow a further reduction in its core size.

14 Claims, 4 Drawing Figures

AC TO DC POWER SUPPLY CIRCUIT

BACKGROUND OF THE INVENTION

This invention relates to an electrical power supply circuit for converting alternating current power into a direct current output and of the type including a transformer for electrically isolating the input from the output and for stepping up or down the input voltage to the level required to provide the DC voltage desired at the output terminals, and deals more particularly with an improved power supply circuit of the foregoing type which further includes a phase control switching means in the primary winding circuit for controlling the conduction angle during those half cycles of input voltage in which conduction takes place through the primary windings.

The general type of power supply circuit with which this invention is concerned is shown by prior U.S. Pat. No. 3,466,527. It includes a transformer having a primary winding adapted for connection to a source of alternating current power, a rectifier connected to the secondary winding of the transformer, a filter capacitor connected across the output of the rectifier and in parallel with the load, a phase control switching device in the primary circuit, and a firing angle control circuit responsive to the output or load voltage for controlling the firing angle of the switching device. The invention may be applied to a circuit wherein the rectifier is a half wave rectifier and the phase control switching device a unidirectional device, so that conduction through the transformer primary winding is limited to alternate half cycles of the input voltage. Preferably, however, and as shown herein, the circuit is one utilizing a full wave rectifier and a bidirectional phase control switching device so that conduction through the primary winding occurs during each half cycle of input voltage.

In the circuit of the aforesaid patent, the full voltage of the AC source appears across the transformer primary winding during substantially all of the time that the phase control switching device is conducting, and during normal operation the firing angle is limited to the last 90° of each half cycle of the input voltage. As an overload current protection feature, the transformer core is sized so that it will not saturate for firing angles occurring in the normal last half of each half cycle range but will saturate for earlier occurring firing angles, thereby producing, when saturation occurs, a surge of input current which positively blows or trips a fuze or other current responsive circuit interrupting safety device. A saturable inductor may be included in the primary circuit, but this inductor saturates soon after the initiation of conduction and has no affect on the primary winding current and voltage throughout most of the conduction angle.

In the power supply circuit of this invention, the inductor in the primary winding circuit is one which does not saturate regardless of the firing angle of the phase control switching device. The inductor, therefore, provides overload protection by limiting the input current to safe levels and by suppressing rapid current changes occurring at any time throughout the conduction angle. Preferably, the circuit components are of such values that the firing or switching ON of the phase control switching device occurs in the last half of each half cycle of the input voltage so that the transformer core need only support a maximum volt-time integral equal to half of the volt-time integral of the input voltage, and the transformer core is preferably of the minimum size necessary to support such maximum volt-time integral. If false triggering of the phase control switching device does occur at a small firing angle and the transformer does saturate, the inductor will limit the current in the primary circuit to a safe level.

Further, since variations in the maximum value of the AC input voltage cause changes in the conduction angle, the transformer primary winding does not see such voltage variations and thus the transformer core need not be oversized to accommodate them. Also, due to the fact that the inductor spreads out the conduction time in each half cycle to lower peak currents, the current ratings of the triac, or other component or components used as the phase control switching means, may be reduced, and wires of smaller size and RMS current rating may be used for the transformer windings, thus further reducing the transformer size and cost. The current through the primary winding is not continuous but instead consists of pulses which start and stop at zero, and the switchings of the phase control device ON and OFF occur at zero current values so that RFI normally associated with such switching devices is greatly reduced.

In the basic circuit of this invention, the conduction angle, during each half cycle, consists of a first portion during which power is transferred from the primary winding to the secondary winding to charge the filter capacitor, and a second portion, occurring after charging of the capacitor ceases, during which no power is transferred between the transformer windings and during which only a small exciting current flows through the primary winding. Although no useful transfer of power is accomplished during the second or primary winding excitation portion of the conduction angle, the primary winding is nevertheless exposed to the input voltage during this time and contributes to the volt-time integral to be supported by the transformer core. Therefore, the basic circuit of this invention may be modified to include a commutator circuit for turning OFF the phase control switching device before the end of the voltage half cycle to avoid exciting the primary winding during all or part of the time of no useful power transfer and to thereby further reduce the volt-time integral and to allow the transformer core size to be correspondingly reduced.

Other objects and advantages of the invention will be apparent from the drawings and from the following description of the preferred embodiments thereof.

SUMMARY OF THE INVENTION

The present invention resides in an electrical power supply circuit for converting alternating current power into a direct output and having two input terminals for connection to a source of AC power and two output terminals for connection to a DC load. A transformer with primary and secondary windings is included in the circuit. The primary winding is connected across the two input terminals in series with a triac or other phase control switching means and a nonsaturating inductor. The secondary winding of the transformer is connected across the input of a rectifier having its output connected across the two output terminals in parallel with a filter capacitor. The transformer core is made of an optimally small size so as to be capable of supporting normal volt-time integrals without saturating, but is is incapable or supporting the volt-time integrals associated with abnormally small firing angles without saturating. The nonsaturating inductor in turn provides overload protection and operates to limit current in the input circuit in the event of false early firing causing transformer core saturation. The phase control switching means may be implemented by various different devices such as a triac or a power transistor in combination with a diode network for causing current to flow through the transistor in the same direction during each half cycle. A control means for the switching device preferably includes a trigger or drive circuit connected across the input terminals and a voltage regulating circuit connected across the output terminals. The voltage regulating circuit produces a signal, responsive to the output voltage, which is coupled with the trigger or drive circuit to vary the timing of the firing signals supplied by the latter circuit to the phase control switching device, and preferably the coupling is an electrically isolated one, such as an optoelectronic coupler, so as to maintain the input fully electrically isolated from the output.

The invention also further resides in a commutator circuit for switching the phase control switching means to an OFF condition before reaching the end of a given half cycle of input voltage to reduce the transformer volt-time integral and to allow a corresponding reduction in transformer core size.

DETAILED DESCRIPTION OF THE PREFERRED EMBODIMENTS

Figure 1:
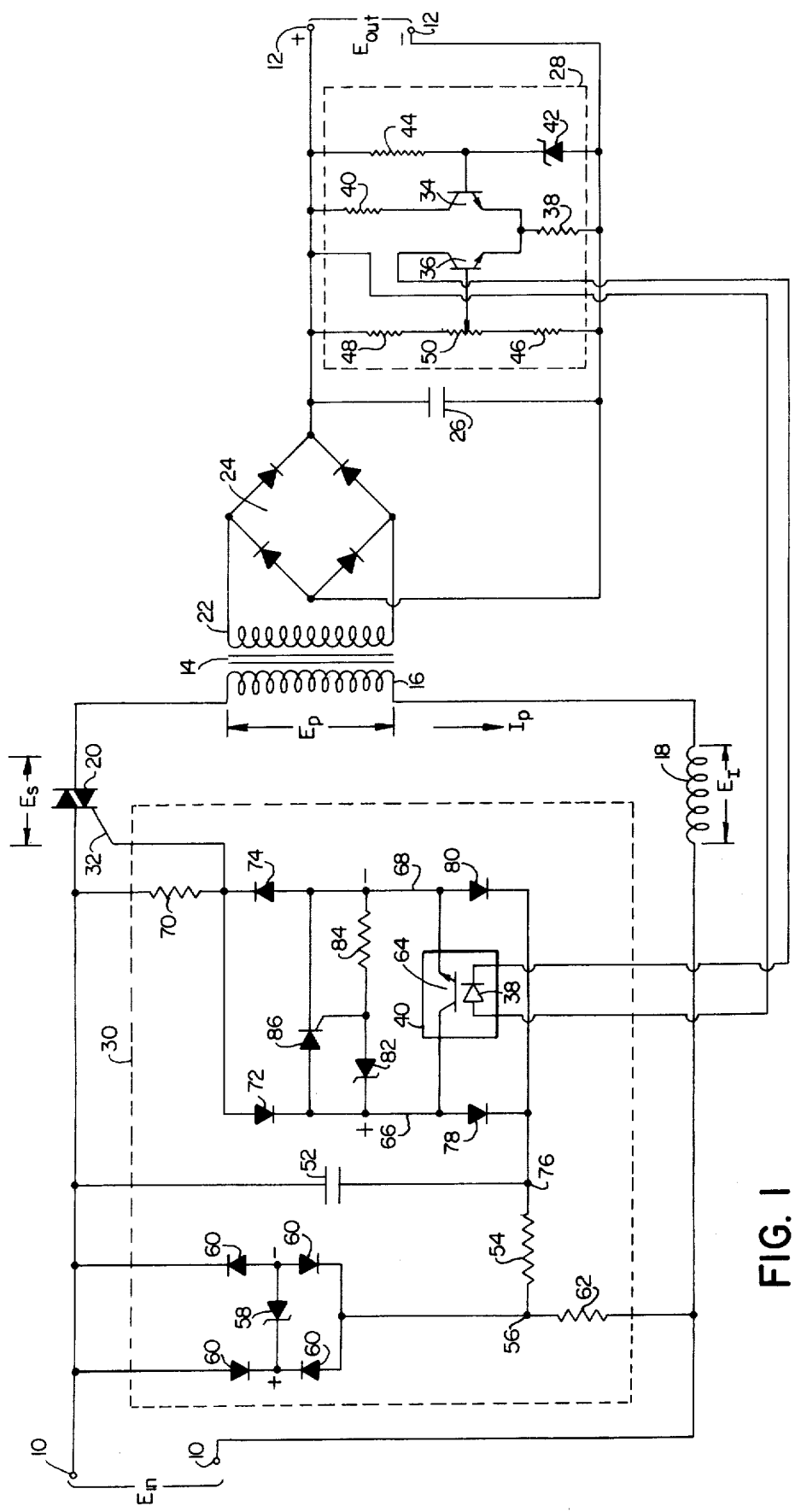
FIG. 1 is a schematic wiring diagram of a power supply circuit embodying this invention.

Turning to FIG. 1, the power supply circuit there shown has two input terminals 10, 10 adapted for connection to a source of alternating current power and two output terminals 12, 12 adapted for connection to a DC load. The AC voltage derived from the AC power source is designated $E_{in}$ and the DC voltage supplied to the load is designated $E_{out}$. A transformer 14 has a primary winding 16 connected to the input terminals 10, 10 in series with an inductor 18 and a phase control switching means in the form of a triac 20. The transformer 14 also has a secondary winding 22 connected across the input of a full wave bridge rectifier 24 in turn having its output connected to the output terminals 12, 12. Also connected across the output terminals 12, 12, so as to be in parallel with the load, is a filter capacitor 26.

The triac 20 is fired at some time or firing angle during each half cycle of the input voltage to provide the desired output voltage at the output terminals 12, 12. A means for controlling the timing of this firing consists of a voltage regulating circuit 28, connected across the output terminals 12, 12, and a trigger pulse generating circuit 30 connected across the input terminals 10, 10. The voltage regulating circuit 28 senses the output voltage appearing across the terminals 12, 12 and produces an electrical regulating signal which varies in accordance with variations in the output voltage. The trigger pulse generating circuit 30 generates trigger pulses which are supplied to the gate terminal 32 of the triac for firing or triggering the triac from its OFF or nonconducting state to its ON or conducting state during each half cycle of input voltage.

The trigger pulse generating circuit 30 is coupled with the voltage regulating circuit 28 and is responsive to the regulating signals so as to vary the timing of the occurrence of the trigger pulse during each half cycle in accordance with variations in the regulating signal. That is, if the regulating signal varies to indicate a drop in the output voltage, the trigger signal generating circuit 30 responds to this change to supply the trigger signals to the triac 20 at a smaller firing angle or earlier time in the half cycle of input voltage to increase the conduction angle and thereby supply a greater amount of power to the output circuit. On the other hand, if the signal from the voltage regulating circuit 28 indicates a rise in the output voltage, the trigger signal generating circuit 30 responds to this change to supply the trigger signal to the triac at a greater firing angle or later time in the half cycle to decrease the conduction angle and the amount of power supplied to the output circuit.

The exact nature of the voltage regulating circuit 28, the trigger pulse generating circuit 30 and the means for coupling the two circuits may vary widely without departing from the invention and the particular circuits shown in FIG. 1 are to be taken as examples only. The illustrated voltage regulating circuit 28 is comprised essentially of a differential amplifier circuit consisting of two NPN transistors 34 and 36 having their emitters coupled and connected to the negative output terminal 12 through a common resistor 38. A load resistor 40 is connected between the positive terminal 12 and the collector of the transistor 34, and between the positive terminal 12 and the collector of the transistor 35 is a light emitting diode 38 comprising the input side of an optoelectronic coupler 40. The base of the transistor 34 is maintained at a constant voltage by a zener diode 42 and resistor 44. The base of the other transistor 36 is associated with a voltage divider connected across the output terminals 12, 12 and including two fixed resistors 46 and 48 and an intermediate potentiometer 50, the wiper of the potentiometer being connected with the base of the transistor 36. This wiper may be set to various different positions to call for different output voltages. Once set to a given position, a decrease in the output voltage will decrease the voltage applied to the base of the transistor 36, and accordingly decrease it relative to the voltage applied to the base of the transistor 34, so that the collector current flowing through the transistor 36 and the light emitting diode 38 will be reduced. Likewise, if the output voltage rises, the base voltage of the transistor 36 also rises to produce an increased current through the light emitting diode 38.

The trigger pulse generating circuit 30 includes a capacitor 52 connected in series with a resistor 54 across one of the input terminals 10 and a point 56. The point 56 is maintained at substantially the same positive or negative voltage during each half cycle of the input voltage, despite variations in the maximum value of the input voltage, by a zener diode 58, a set of diodes 60, 60 and a resistor 62 connected between the input terminals 10 and to the point 56 as shown. Thus, during each half cycle of input voltage, the capacitor 52 will tend to be charged through the resistor 54 from the fixed voltage of the point 56. The rate of charging of the capacitor 52 is, however, controlled by an additional circuit shunting the capacitor 52 and essentially the variable resistance of a phototransistor 64 comprising the output side of the coupler 40.

The phototransistor 64 is connected between two lines 66 and 68 which are connected to the upper input terminal 10 by a resistor 70 and two diodes 72, 74, and which are connected to the node 76 between the capacitor 52 and resistor 54 by two diodes 78 and 80, the diodes 72, 74, 78 and 80 being arranged as shown so that regardless of the polarity of the input voltage, current will flow through the circuit in such a manner that the line 66 is positive with respect to the line 68. Accordingly, during any particular half cycle of the input voltage, the phototransistor 64 in series with the resistor 70 will shunt the capacitor 52. As the resistance of the phototransistor 64 decreases, the charging rate of the capacitor 52 decreases, and as the resistance of the phototransistor 64 increases, the charging rate of the capacitor 52 increases.

Also connected across the lines 66 and 68 is a zener diode 82 and a resistor 84, in series with one another, and an SCR 86 having its anode connected to the line 66, its cathode to the line 68 and its gate terminal to the node between the zener diode 82 and resistor 84. The voltage across the two lines 66 and 68 is controlled by the charge on the capacitor 52. Therefore, as the capacitor 52 charges, the point will eventually be reached where the voltage across the lines 66 and 68 exceeds the breakdown voltage of the zener diode 82, with the result that it will break down and apply a trigger voltage to the gate of the SCR 86. This turns the SCR 86 on with the result that the capacitor 52 is discharged through it to produce a triggering pulse applied to the gate 32 of the triac 20, thereby firing or turning on the triac for the particular half cycle of input voltage in question.

Considering the operation of the voltage regulating circuit 28 and trigger pulse generating circuit 30 in combination, therefore, it will be understood that as the output voltage at the terminals 12, 12 increases current through the light emitting diode 38 increases to decrease the resistance of the phototransistor 64 and thereby slowing down the charging rate of the capacitor 52 and thereby delaying the firing of the triac 20. Similarly, if the output voltage decreases, the current through the light emitting diode 38 decreases, increasing the resistance of the phototransistor 64, increasing the charging rate of the capacitor 52 and causing the triac 20 to be fired at an earlier time in the half cycle of input voltage.

Figure 2:
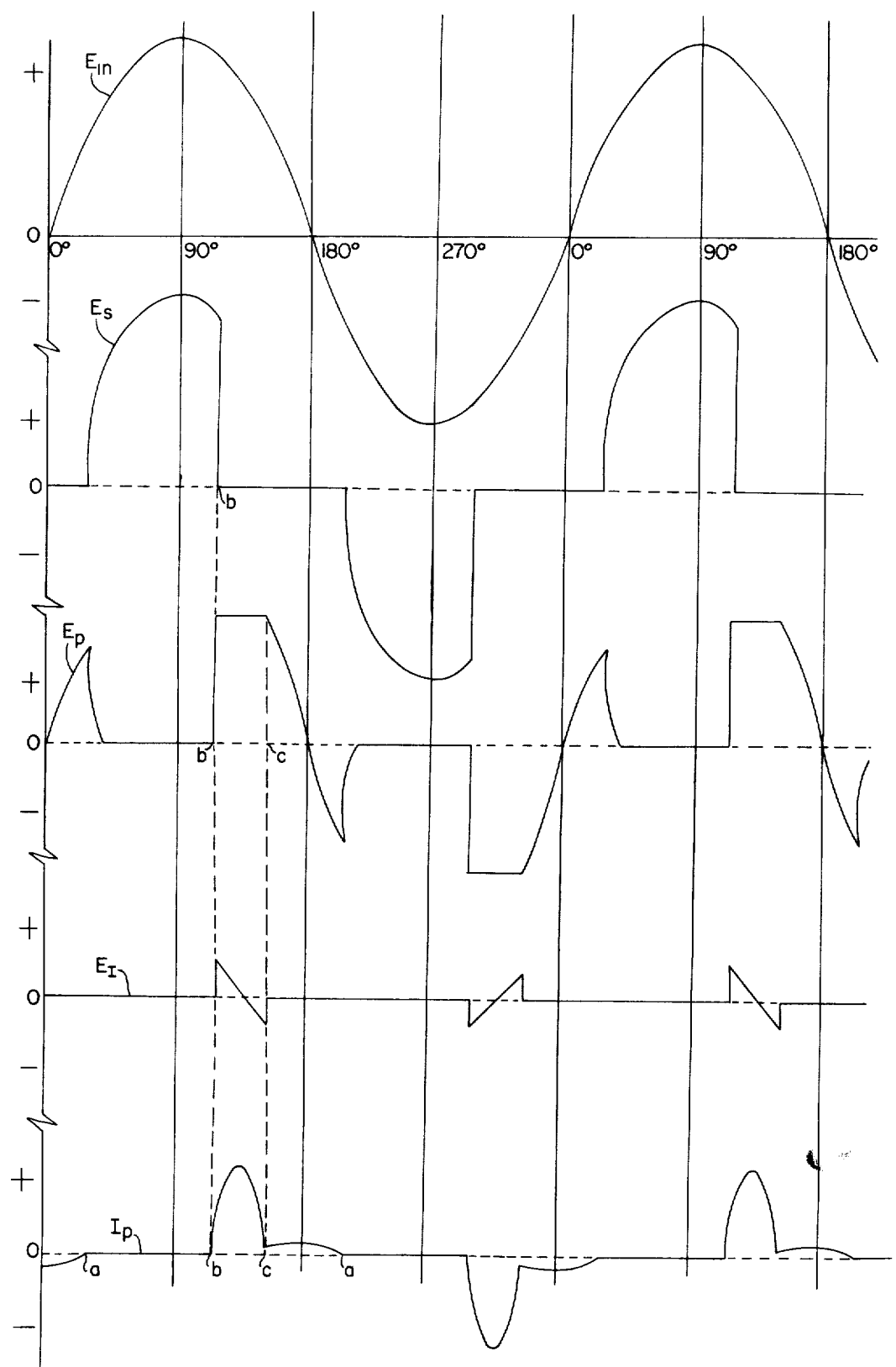
FIG. 2 is a diagram showing the waveforms of various voltages and currents appearing in the power supply circuit of FIG. 1 during its operation.

Having now described the construction of the complete circuit of FIG. 1, its operation may be considered in conjunction with FIG. 2. FIG. 2 shows the nature of the voltage and current waveforms occurring in various parts of the system, these waveforms being in sequence, and going from the top to the bottom of FIG. 2, the voltage $E_{in}$ applied across the input terminals 10, 10, the voltage $E_t$ appearing across the triac 20, the voltage $E_p$ appearing across the transformer primary 16, the voltage $E_I$ appearing across the inductor 18, and the current $I_p$ flowing through the triac, primary winding and inductor.

At the beginning of each half cycle of input voltage $E_{in}$, the triac 20 is not yet turned OFF since the current through it has not yet reached zero because of the inductance of the primary winding. Shortly after the beginning of the half cycle, however, the current does reach zero, at the point marked $a$, and the triac then turns OFF so that the full input voltage appears across the triac until the triac is turned ON at point $b$. As soon as the triac is turned ON at point $b$, current flows through the primary winding 16 and the inductor 18. The voltage $E_p$ across the primary is essentially the voltage appearing across the filter capacitor 26 as reflected from the secondary winding to the primary winding and is relatively constant while the capacitor charges. In the illustrated waveform for $E_p$, this relatively constant voltage which occurs while the filter capacitor is charged appears between the points $b$ and $c$ and is the portion of the conduction angle during which power is transferred from the primary to the secondary. During the time between point $b$ and point $c$ the difference in voltage between $E_{in}$ and $E_p$ is the voltage $E_I$ which appears across the inductor 18. Thus, because the inductor 18 is available to provide an impedance absorbing this voltage difference, high peak currents through the triac and primary winding are suppressed.

After point $c$, the output voltage on the primary winding is less than needed to cause continued charging of the capacitor 26 and thereafter the only current which flows through the primary winding is a small excitation current. In the illustrated $I_p$ waveform, the current which flows through the primary during the charging of the capacitor is the relatively large pulse occurring between the points $b$ and $c$, and current which flows as primary excitation current is that present between the points $c$ and $a$. The current pulse appearing between the points $b$ and $c$ is substantially broader and lower than would be in the absence of the inductance provided by the inductor 18.

The components making up the circuit of FIG. 1 are preferably so chosen that the desired output voltage may be obtained by firing angles occurring in the last half of each half cycle, and the transformer core is sized so as to support a volt-time integral only a little more than the maximum volt-time integral encountered with such range of firing angles, thereby maintaining the transformer core at an optimally small size and cost. The inductor 18, is however, designed so as not to saturate in the case of even the smallest firing angles, such as may be caused by shorting the output terminals 12, 12 and which may cause saturation of the transformer core. It therefore is always available and effective to act as an overload protection device for suppressing high peak currents such as may be produced by saturation of the transformer core due to triac firing at firing angles smaller than those designed for.

Figure 3:
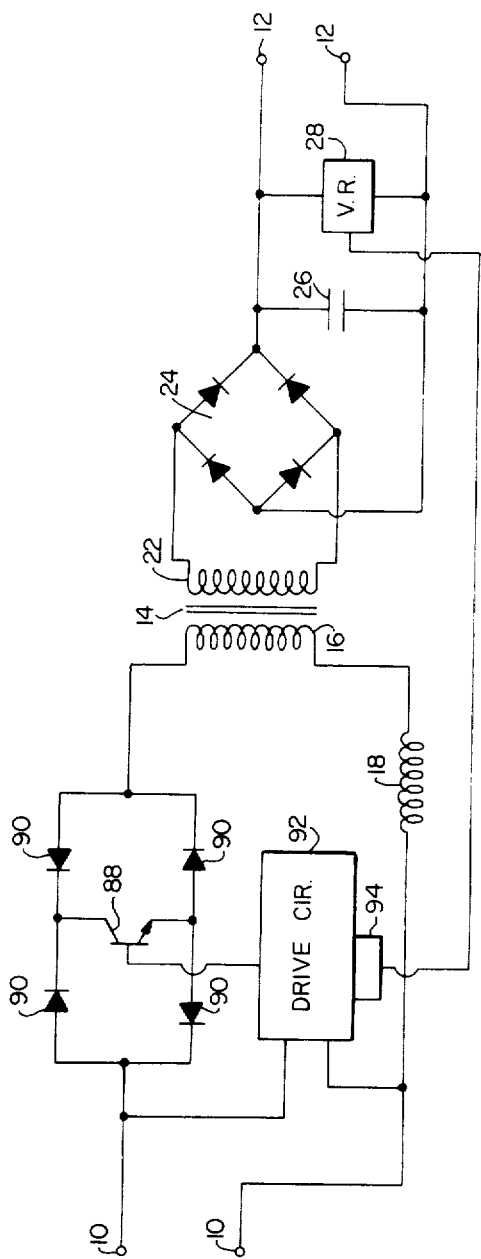
FIG. 3 is a schematic wiring diagram of a power supply circuit comprising an alternative embodiment of this invention.
Figure 4:
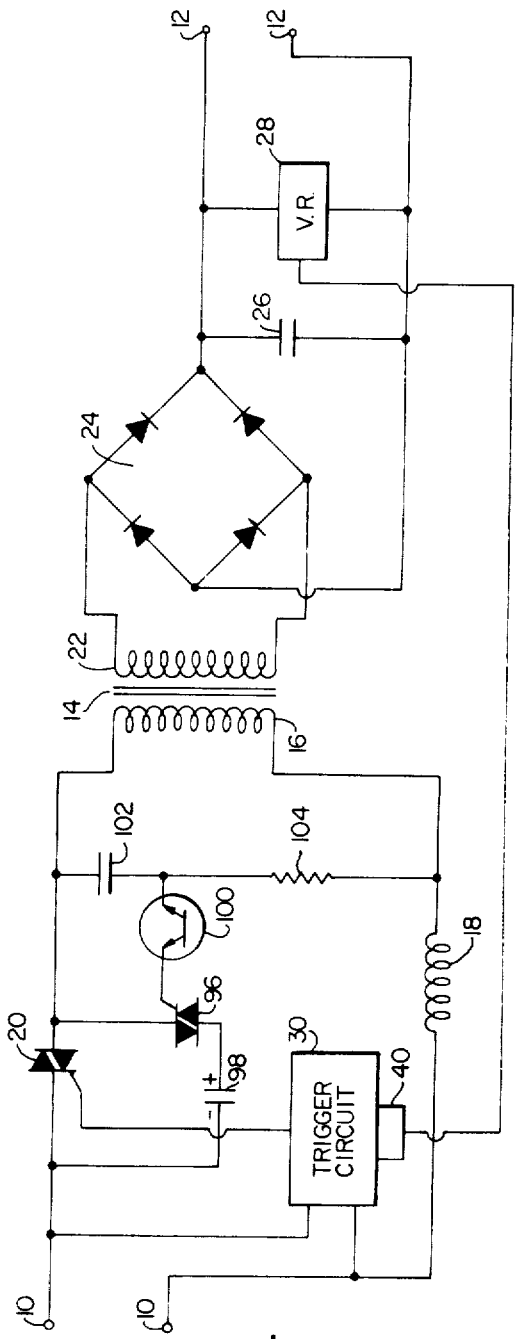
FIG. 4 is a schematic wiring diagram of a power supply circuit comprising still another alternative embodiment of this invention.

FIGS. 3 and 4 show alternative embodiments of the invention. The circuit of FIG. 3 is substantially similar to that of FIG. 1 except that in place of the triac 20 of FIG. 1, the phase control switching means consists of a power transistor 88 and a network of four diodes 90, 90 arranged as shown to cause current to flow through the transistor 88 in the same direction for all half cycles of the input voltage. Also, in place of the trigger pulse generating circuit 30 of FIG. 1, the circuit of FIG. 3 has a drive circuit 92 for the transistor 88. The drive circuit 92 is coupled with the voltage regulator 28 through a coupler 94 which may be an optoelectronic device similar to the coupler 40 of FIG. 1. The drive circuit 92 is connected between the input lines 10, 10 and may be of any suitable design which operates to provide a drive signal to the base of the transistor 88 which during each half cycle of input voltage first transfers from an OFF to an ON value to turn the transistor from a hard OFF condition to a hard ON condition and then subsequently transfers from its ON to its OFF value to return the transistor to its hard OFF condition, the timing of the switching from the OFF to the ON condition being controlled by the voltage regulating signal supplied to the coupler 94 by the voltage regulator 28.

The circuit of FIG. 4 is similar to the circuit of FIG. 1 in all respects except that it further includes a commutation circuit for turning the triac 20 OFF before the end of the instant half cycle of input voltage, and before the current through the triac drops to zero, in order to remove the input voltage from the transformer primary winding during a further portion of the input voltage waveform to further reduce the volt-time integral requirements of the transformer core.

In referring to FIG. 4, the commutation circuit consists of a triac 96 and capacitor 98 connected in series with one another across the first triac 20 as shown. The gate terminal of the triac 96 is connected through a diac 100 to the node between the capacitor 102 and resistor 104 connected in series with one another across the primary winding 16.

To consider the functioning of the commutation circuit, assume that a half cycle of input voltage appears across the two input terminals 10, 10 os such polarity as to put a positive voltage on the top input line. The capacitor 98 is, at the beginning of this half cycle charged minus on the left to plus on the right, as indicated in FIG. 4, from the preceding half cycle of operation, and the triac 96 and diac 100 are both non-conducting. At the time the triac 20 fires, the capacitor 102 begins to charge through the resistor 104, and eventually the charge on the capacitor 102 builds up to the point where the diac 100 turns ON and applies the capacitor charge to the gate of the triac 96 to fire it. When the triac 96 fires, the charge on the capacitor 98 appears across the triac 20 and by overcoming the current then flowing through the triac 20, turns if OFF. The capacitor 98 thereafter continues to discharge, and because of the inductance of the primary coil 16 and the inductor 8 current continues to flow in the same direction through the triac 96, primary winding 16 and inductor 8 and causes the charge on the capacitor 98 to become reversed and of a relatively high value sufficient to stop the current through the triac 20 during the next half cycle when the triac 96 is again fired.

I claim:

1. A power supply circuit for converting alternating current power into a voltage regulated direct current output, said power supply circuit comprising a pair of input terminals for connection to a source of AC power and a pair of output terminals for connection to a DC load, a transformer with a primary winding and a secondary winding, a phase control switching means an an inductor connected in series with one another and with said primary winding across said input terminals, a rectifier having an input connected across said secondary winding and an output connected across said two output terminals, a filter capacitor connected across said two output terminals, and a voltage regulating means responsive to the DC output voltage appearing across said output terminals for controlling the firing angle of said phase control switching means so as to maintain said DC output voltage at a desired value, said inductor being one which does not saturate during any half cycle of the voltage waveform of said AC power source even when said output terminas are shorted, and said transformer having a core of an optimally small size capable of supporting volt-time integrals associated with normal firing angles without saturating but incapable of supporting volt-time integrals associated with abnormally small firing angles whereby said core is of substantially smaller size than the size required to support volt-time integrals associated with such abnormally small firing angles and whereby in the event of said core saturating said inductor imposes an impedance to limit current through said primary winding.

2. A power supply circuit as defined in claim 1 further characterized by said rectifier being a full wave rectifier, and said phase control switching means being a bidirectional switching means for switching AC power from said input terminals to said primary winding during each half cycle of the AC input voltage applied across said input terminals.

3. A power supply circuit as defined in claim 1 further characterized by said bidirectional phase control switching means being a bistable switching component having for each direction of current flow therethrough a conducting and a non-conducting state, said bistable switching component also having a gate terminal and being one which is switched from its non-conducting to its conducting state by a trigger pulse signal applied to said gate terminal.

4. A power supply circuit as defined in claim 3 further characterized by said voltage regulating means comprising a voltage regulator circuit connected across said output terminals for developing an electrical signal which varies in accordance with the DC output voltage appearing across said output terminals, a trigger circuit connected across said input terminals for developing, during each half cycle of the AC input voltage applied across said input terminals, a trigger pulse signal for triggering said bistable switching component from its non-conducting to its conducting state, said trigger circuit being coupled with said electrical signal of said voltage regulator and being responsive thereto to control the timing of the trigger pulse signal produced during each of said half cycles.

5. A power supply circuit as defined in claim 4 further characterized by said electrical signal of said voltage regulator being coupled with said trigger circuit through an electrically isolating coupler so as to electrically isolate said voltage regulator from said trigger circuit.

6. A power supply circuit as defined in claim 2 further characterized by said bidirectional switching device being a triac.

7. A power supply circuit as defined in claim 2 further characterized by said bidirectional switching means comprising a unidirectional switching component and a diode network connected therewith for causing current to be directed through said switching component in the same direction during each half cycle of said AC input voltage.

8. A power supply circuit as defined in claim 7 further characterized by said unidirectional switching component being a transistor.

9. A power supply circuit as defined in claim 8 further characterized by said voltage regulating means comprising a voltage regulator circuit connected across said output terminals for developing an electrical signal which varies in accordance with the DC output voltage appearing across said output terminals, a drive signal circuit connected across said input terminals for developing during each half cycle of said input voltage a transistor drive signal applied to the control terminal of said transistor for controlling its conduction and which transistor drive signal switches from an OFF value to an ON value to correspondingly switch the transistor from a non-conducting state to a conducting state during each of said half cycles, said drive signal circuit being coupled with said electrical signal of said voltage regulator circuit and being responsive thereto control the timing of the switching of said drive signal from said OFF value to said ON value during each of said half cycles.

10. A power supply circuit for converting alternating current power into a direct current output, said power supply circuit comprising a pair of input terminals for connection to a source of AC power and a pair of output terminals for connection to a DC load, a transformer with a primary winding and a secondary winding, a phase control switching means and an inductor connected in series with one another and with said primary winding across said input terminals, a rectifier having an input connected across said secondary winding and an output connected across said two output terminals, a filter capacitor connected across said two output terminals, and a control means for controlling the firing angle of said phase control switching means, said inductor being non-saturating for all firing angles of said phase control switching means, and said transformer having a core of an optimally small size capable of supporting volt-time integrals associated with normal firing angles without saturating but incapable of supporting volt-time integrals associated with abnormally small firing angles whereby said core is substantially smaller size than the size required to support volt-time integrals associated with such abnormally small firing angles and whereby in the event of said core saturating said inductor imposes an impedance to limit current through said primary winding.

11. A power supply circuit for converting alternating current power into a voltage regulated direct current output, said power supply circuit comprising a pair of input terminals for connection to a source of AC power and a pair of output terminals for connection to a DC load, a transformer with a primary winding and a secondary winding, a phase control switching means and an inductor connected in series with one another and with said primary winding across said input terminals, a rectifier having an input connected across said secondary winding and an output connected across said two output terminals, a filter capacitor connected across said two output terminals, and a voltage regulating means responsive to the DC output voltage appearing across said output terminals for controlling the firing angle of said phase control switching means so as to maintain said DC output voltage at a desired value, said inductor being one which does not saturate during any half cycle of the voltage waveform of said AC power source even when said output terminals are shorted, said bidirectional phase control switching means being a bistable switching component having for each direction of current flow therethrough a conducting and a non-conducting state, said bistable switching component also having a gate terminal and being one which is switched from its non-conducting to its conducting state by a trigger pulse signal applied to said gate terminal, said voltage regulating means comprising a voltage regulator circuit connected across said output terminals for developing an electrical signal which varies in accordance with the DC output voltage appearing across said output terminals, a trigger circuit connected across said input terminals for developing, during each half cycle of the AC input voltage applied across said input terminals, a trigger pulse signal for triggering said bistable switching component from its nonconducting to its conducting state, said trigger circuit being coupled with said electrical signal of said voltage regulator and being responsive thereto to control the timing of the trigger pulse signal produced during each of said half cycles, and said electrical signal of said voltage regulator being coupled with said trigger circuit through an optoelectronic isolating coupler so as to electrically isolate said voltage regulator from said trigger circuit.

12. A power supply circuit for converting alternating current power into a voltage regulated direct current output, said power supply circuit comprising a pair of input terminals for connection to a source of AC poer and a pair of output terminals for connection to a DC load, a transformer with a primary winding and a secondary winding, a phase control switching means an an inductor connected in series with one another and with said primary winding across said input terminals, a rectifier having an input connected across said secondary winding and an output connected across said two output terminals, a filter capacitor connected across said two output terminals, and a voltage regulating means responsive to the DC output voltage appearing across said output terminals for controlling the firing angle of said phase control switching means so as to maintain said DC output voltage at a desired value, said inductor being one which does not saturate during any half cycle of the voltage waveform of said AC power source even when said output terminals are shorted, said rectifier being a full wave rectifier, and said phase control switching means being a bidirectional switching means for switching AC power from said input terminals to said primary winding during each half cycle of the AC input voltage applied across said input terminals, said bidirectional switching means comprising a transistor and diode network connected therewith for causing current to be directed through said switching component in the same direction during each half cycle of said AC input voltage, said voltage regulating means comprising a voltage regulator circuit connected across said output terminals for developing an electrical signal which varies in accordance with the DC output voltage appearing across said otput terminals, a output signal circuit connected across said input terminals for developing during each half cycle of said input voltage a transistor drive signal applied to the control terminal of said transistor for controlling its conduction and which transistor drive signal switches from an OFF value to an ON value to correspondingly switch the transistor from a non-conducting state to a conducting state during each of said half cycles, said drive signal circuit being coupled with said electrical signal of said voltage regulator circuit and being responsive thereto to control the timing of the switching of said drive signal from said OFF value to said ON value during each of said half cycles, and said electrical signal of said voltage regulator being coupled with said drive signal circuit through an optoelectronic isolating coupler so as to electrically isolate said voltage regulator from said drive signal circuit.

13. A power supply circuit for converting alternating current power into a voltage regulated direct current output, said power supply circuit comprising a pair of input terminals for connection to a source of AC power and a pair of output terminals for connection to a DC load, a transformer with a primary winding and secondary winding, a phase control switching means and an inductor connected in series with one another and with said primary winding across said input terminals, said inductor being one which does not saturate during any half cycle of the voltage waveform of said AC power source even when said output terminals are shorted, a rectifier having an input connected across said secondary winding and an output connected across said two output terminals, a filter capacitor connected across said two output terminals, a voltage regulating means responsive to the DC output voltage appearing across said output terminals for controlling the firing angle of said phase control switching means so as to maintain said DC output voltage at a desired value, and a commutation circuit connected with said phase control switching means operable after said phase control switching means is turned ON during a given half cycle of the AC input voltage applied across said input terminals for switching said phase control switching means OFF before the end of said given half cycle.

14. A power supply circuit for converting alternating current power into a voltage regulated direct current output, said poer supply circuit comprising a pair of input terminals for connection to a source of AC power and a pair of output terminals for connection to a DC load, a transformer with a primary winding and a secondary winding, a phase control switching means an an inductor connected in series with one another and with said primary winding across said input terminals, a rectifier having an input connected across said secondary winding and an output connected across said two output terminals, a filter capacitor connected across said two output terminals, and a voltage regulating means responsive to the DC output voltage appearing across said output terminals for controlling the firing angle of said phase control switching means so as to maintain said DC output voltage at a desired value, said inductor being one which does not saturate during any half cycle of the voltage waveform of said AC power source even when said output terminals are shorted, said transformer having a core of an optimally small size capable of supporting volt-time integrals associated with normal firing angles without saturating but incapable of supporting volt-time integrals associated with abnormally small firing angles, said phase control switching means being a bi-directional switching means for switching AC power from said input terminals to said primary winding during each half cycle of the AC input voltage applied across said input terminals, said bi-directional switching means comprising a transistor and a diode network connected therewith for causing current to be directed through said transistor in the same direction during each half cycle of said AC input voltage, said voltage regulating means comprising a voltage regulator circuit connected across said output terminals for developing an electrical signal which varies in accordance with the DC output voltage appearing across said output terminals, a drive signal circuit connected across said input terminals for developing during each half cycle of said input voltage a transistor drive signal applied to the control terminal of said transistor for controlling its conduction and which transistor drive signal switches from an OFF value to an ON value to correspondingly switch said transistor from a nonconducting state to a conducting state during each of said half cycles, said drive signal circuit being coupled with said electrical signal of said voltage regulator circuit and being responsive thereto to control the timing of the switching of said drive signal from said OFF value to said ON value during each of said half cycles, and said electrical signal of said voltage regulator being coupled with said drive signal circuit through an electrically isolating coupler so as to electrically isolate said voltage regulator from said drive signal circuit.

* * * * *